(12) United States Patent
Goleski et al.

(10) Patent No.: US 9,145,953 B2
(45) Date of Patent: Sep. 29, 2015

(54) MULTI-SPEED TRANSMISSION

(71) Applicant: FORD GLOBAL TECHNOLOGIES, LLC, Dearborn, MI (US)

(72) Inventors: Gregory Daniel Goleski, Rochester Hills, MI (US); Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 13/855,782

(22) Filed: Apr. 3, 2013

(65) Prior Publication Data

US 2013/0316870 A1 Nov. 28, 2013

Related U.S. Application Data

(63) Continuation-in-part of application No. 13/480,960, filed on May 25, 2012, now Pat. No. 8,545,362.

(60) Provisional application No. 61/715,706, filed on Oct. 18, 2012.

(51) Int. Cl.
   *F16H 3/62* (2006.01)
   *F16H 3/66* (2006.01)

(52) U.S. Cl.
   CPC .. *F16H 3/62* (2013.01); *F16H 3/66* (2013.01); *F16H 2200/0069* (2013.01); *F16H 2200/2012* (2013.01); *F16H 2200/2046* (2013.01)

(58) Field of Classification Search
   CPC ............................ F16H 3/62; F16H 2200/0069
   USPC ............................ 475/271, 275, 277, 282, 288
   See application file for complete search history.

(56) References Cited

U.S. PATENT DOCUMENTS

| | | | |
|---|---|---|---|
| 6,053,839 A | 4/2000 | Baldwin et al. | |
| 7,789,792 B2 | 9/2010 | Kamm et al. | |
| 8,007,394 B2 | 8/2011 | Phillips et al. | |
| 8,016,708 B2 | 9/2011 | Diosi et al. | |
| 8,231,495 B2 | 7/2012 | Gumpoltsberger et al. | |
| 8,251,855 B2 | 8/2012 | Diosi et al. | |
| 8,303,455 B2 | 11/2012 | Gumpoltsberger et al. | |
| 8,545,362 B1 | 10/2013 | Goleski et al. | |
| 8,556,765 B2 * | 10/2013 | Bockenstette et al. | 475/275 |
| 2004/0121877 A1 | 6/2004 | Lee et al. | |
| 2009/0088289 A1 | 4/2009 | Baldwin | |
| 2010/0234167 A1 | 9/2010 | Lee et al. | |
| 2010/0279814 A1 | 11/2010 | Brehmer | |
| 2011/0294617 A1 * | 12/2011 | Seo et al. | 475/275 |
| 2012/0053008 A1 | 3/2012 | Beck et al. | |
| 2013/0150201 A1 * | 6/2013 | Knox et al. | 475/276 |
| 2013/0345014 A1 | 12/2013 | Mellet et al. | |
| 2014/0100073 A1 | 4/2014 | Lee | |
| 2014/0106923 A1 | 4/2014 | Burgerson et al. | |
| 2014/0106925 A1 | 4/2014 | Mellet et al. | |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — Justin Holmes
*Assistant Examiner* — Stacey Fluhart
(74) *Attorney, Agent, or Firm* — James Dottavio; Brooks Kushman P.C.

(57) ABSTRACT

A family of transmission gearing arrangements produces up to ten forward and one reverse speed ratios by selective engagement of various combinations of three or four shift elements. Each disclosed transmission includes four planetary gear sets and six shift elements. Two of the shift elements can be brakes.

24 Claims, 3 Drawing Sheets

MULTI-SPEED TRANSMISSION

CROSS-REFERENCE TO RELATED APPLICATIONS

This application is a continuation-in-part of U.S. application Ser. No. 13/480,960 filed May 25, 2012, now U.S. Pat. No. 8,545,362, the disclosure of which is incorporated in its entirety by reference herein. This application claims the benefit of U.S. Provisional Application No. 61/715,706, filed Oct. 18, 2012, the disclosure of which is incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

In a first embodiment, a transmission includes input, output, and intermediate shafts, four simple planetary gear sets, at least four clutches, and at least one brake. The input shaft is fixedly coupled to the carrier of the first planetary gear set. The output shaft is fixedly coupled to the carrier of the second planetary gear set. The third sun gear is fixedly coupled to the first ring gear. When the first clutch is engaged, the intermediate shaft is coupled to the third ring gear and the second ring gear is coupled to the third carrier. In some embodiments, the intermediate shaft may be fixedly coupled to the third ring gear while a first clutch selectively couples the second ring gear to the third carrier. In other embodiments, the second ring gear may be fixedly coupled to the third carrier while a first clutch selectively couples the intermediate shaft to the third ring gear. A second clutch selectively couples the third sun gear to the intermediate shaft. A third clutch selectively couples the input shaft to the second sun gear. A fourth clutch selectively couples the second sun gear to the intermediate shaft. A first brake selectively holds the first sun gear against rotation. When a sixth shift element is engaged, the fourth sun gear is coupled to the first sun gear, the fourth carrier is coupled to the second ring gear, and the fourth ring gear is held against rotation. The sixth shift element may be a second brake selectively holding the fourth ring gear against rotation.

In a second embodiment, a transmission includes input, output, and intermediate shafts, four gearing arrangements, at least four clutches, and at least one brake. The first gearing arrangement imposes a linear speed relationship among a first element, the input shaft, and a second element. The second gearing arrangement imposes a linear speed relationship among a third element, the output shaft, and a fourth element. The third gearing arrangement imposes a linear speed relationship among the second element, a fifth element, and a sixth element. The fourth gearing arrangement selectively constrains the speed of the fourth element to be between zero and the speed of the first element. When the first clutch is engaged, the intermediate shaft is coupled to the sixth element and the fourth element is coupled to the fifth. In some embodiments, the intermediate shaft may be fixedly coupled to the fourth element while a first clutch selectively couples the fifth element to the sixth element. In other embodiments, the fifth element may be fixedly coupled to the sixth element while a first clutch selectively couples the intermediate shaft to the sixth element. A second clutch selectively couples the second element to the intermediate shaft. A third clutch selectively couples the input shaft to the third element. A fourth clutch selectively couples the third element to the intermediate shaft. A first brake selectively holds the first element against rotation.

In a third embodiment, a transmission includes input and output shafts, four gearing arrangements, a clutches, a brake, and a clutch module. The first gearing arrangement imposes a linear speed relationship among a first element, the input shaft, and a second element. The second gearing arrangement imposes a linear speed relationship among a third element, the output shaft, and a fourth element. The third gearing arrangement imposes a linear speed relationship among the second element, a fourth element, and a fifth element. The fourth gearing arrangement selectively constrains the speed of the fourth element to be between zero and the speed of the first element. A first clutch selectively couples the third element to the input shaft. A first brake selectively holds the first element against rotation. The clutch module is configured to selectively couple any two of the second element, the third element, and the fifth element. In some embodiments, the clutch module may include an intermediate shaft and three clutches each selectively coupling the intermediate shaft to a respective one of the second, third, and fifth elements. In other embodiments, the clutch module may include three clutches each selectively directly coupling two of the second, third, and fifth elements.

In a fourth embodiment, a transmission includes input and output shafts, seven intermediate shafts, four clutches, and two brakes. The brakes selectively hold the first and third intermediate shafts, respectively, against rotation. Three of the clutches selectively couple the seventh shaft to the fourth, fifth, and sixth intermediate shafts, respectively. The remaining clutch selectively couples the input shaft to the sixth shaft. The transmission may also include four gearing arrangements. The first gearing arrangement imposes a linear speed relationship among a first intermediate shaft, the second intermediate shaft, and the third intermediate shaft. The second gearing arrangement imposes a linear speed relationship among a first intermediate shaft, the input shaft, and the fourth intermediate shaft. The third gearing arrangement imposes a linear speed relationship among a fourth intermediate shaft, the second intermediate shaft, and the fifth intermediate shaft. The fourth gearing arrangement imposes a linear speed relationship among a sixth intermediate shaft, the output shaft, and the second intermediate shaft. Each of the gearing arrangements may be a simple planetary gear set.

In a fifth embodiment, a transmission includes input and output shafts, seven intermediate shafts, four clutches, and two brakes. The brakes selectively hold the first and third intermediate shafts, respectively, against rotation. Two of the clutches selectively couple the seventh intermediate shaft to the sixth intermediate shaft and input shaft, respectively. The other two clutches selectively couple the fifth intermediate shaft to the second and sixth intermediate shafts, respectively. The transmission may also include four gearing arrangements. The first gearing arrangement imposes a linear speed relationship among a first intermediate shaft, the second intermediate shaft, and the third intermediate shaft. The second gearing arrangement imposes a linear speed relationship among a first intermediate shaft, the input shaft, and the fourth intermediate shaft. The third gearing arrangement imposes a linear speed relationship among a fourth intermediate shaft, the fifth intermediate shaft, and the sixth intermediate shaft. The fourth gearing arrangement imposes a linear speed relationship among a seventh intermediate shaft, the output shaft, and the second intermediate shaft. Each of the gearing arrangements may be a simple planetary gear set.

DETAILED DESCRIPTION

Figure 1:
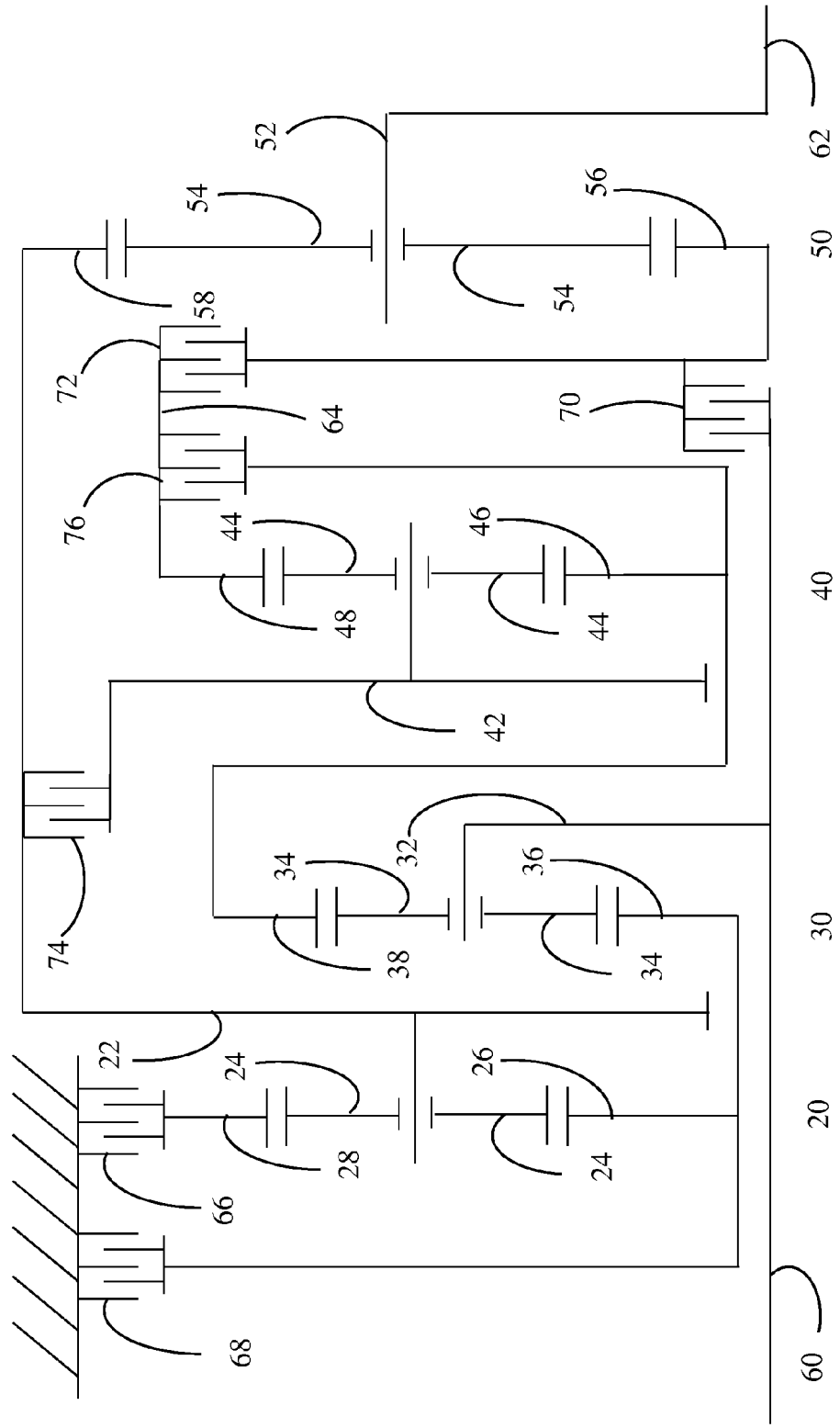
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| Ring 28/Sun 26 | 2.20 |
| Ring 38/Sun 36 | 1.75 |
| Ring 48/Sun 46 | 1.60 |
| Ring 58/Sun 56 | 3.70 |

In the transmission of FIG. 1, sun gear 26 is fixedly coupled to sun gear 36, carrier 22 is fixedly coupled to ring gear 58, ring gear 38 is fixedly coupled to sun gear 46, input shaft 60 is fixedly coupled to carrier 32, and output shaft 62 is fixedly coupled to carrier 52. Ring gear 28 is selectively held against rotation by brake 66 and sun gears 26 and 36 are selectively held against rotation by brake 68. Input shaft 60 is selectively coupled to sun gear 56 by clutch 70. Intermediate shaft 64 is fixedly coupled to ring gear 48, selectively coupled to sun gear 56 by clutch 72, and selectively coupled to ring gear 38 and sun gear 46 by clutch 76. Note that engaging clutch 76 constrains gear set 40 to rotate as a single unit. This effect can alternatively be achieved by a clutch selectively coupling carrier 42 to either sun gear 46 or to ring gear 48. Carrier 42 is selectively coupled to carrier 22 and ring gear 58 by clutch 74.

As shown in Table 2, engaging the clutches and brakes in combinations of four establishes ten forward speed ratios and one reverse speed ratio between input shaft 60 and output shaft 62. An X indicates that the clutch is required to establish the speed ratio. An (X) indicates the clutch can be applied but is not required. In 1st gear, either clutch 74 or clutch 76 can be applied instead of applying clutch 72 without changing the speed ratio. When the gear sets have tooth numbers as indicated in Table 1, the speed ratios have the values indicated in Table 2.

TABLE 2

|  | 66 | 68 | 70 | 72 | 74 | 76 | Ratio | Step |
|---|---|---|---|---|---|---|---|---|
| Rev | X | X |  | X | X |  | −4.79 | 102% |
| 1st | X | X | X | (X) |  |  | 4.70 |  |
| 2nd | X | X |  | X |  | X | 2.99 | 1.57 |
| 3rd | X |  | X | X |  | X | 2.18 | 1.37 |
| 4th | X |  |  | X | X | X | 1.80 | 1.21 |
| 5th | X |  | X |  | X | X | 1.54 | 1.17 |
| 6th | X |  | X | X | X |  | 1.29 | 1.19 |
| 7th |  |  | X | X | X | X | 1.00 | 1.29 |
| 8th |  | X | X | X | X |  | 0.85 | 1.17 |
| 9th |  | X | X |  | X | X | 0.69 | 1.24 |
| 10th |  | X |  | X | X | X | 0.64 | 1.08 |

Figure 2:
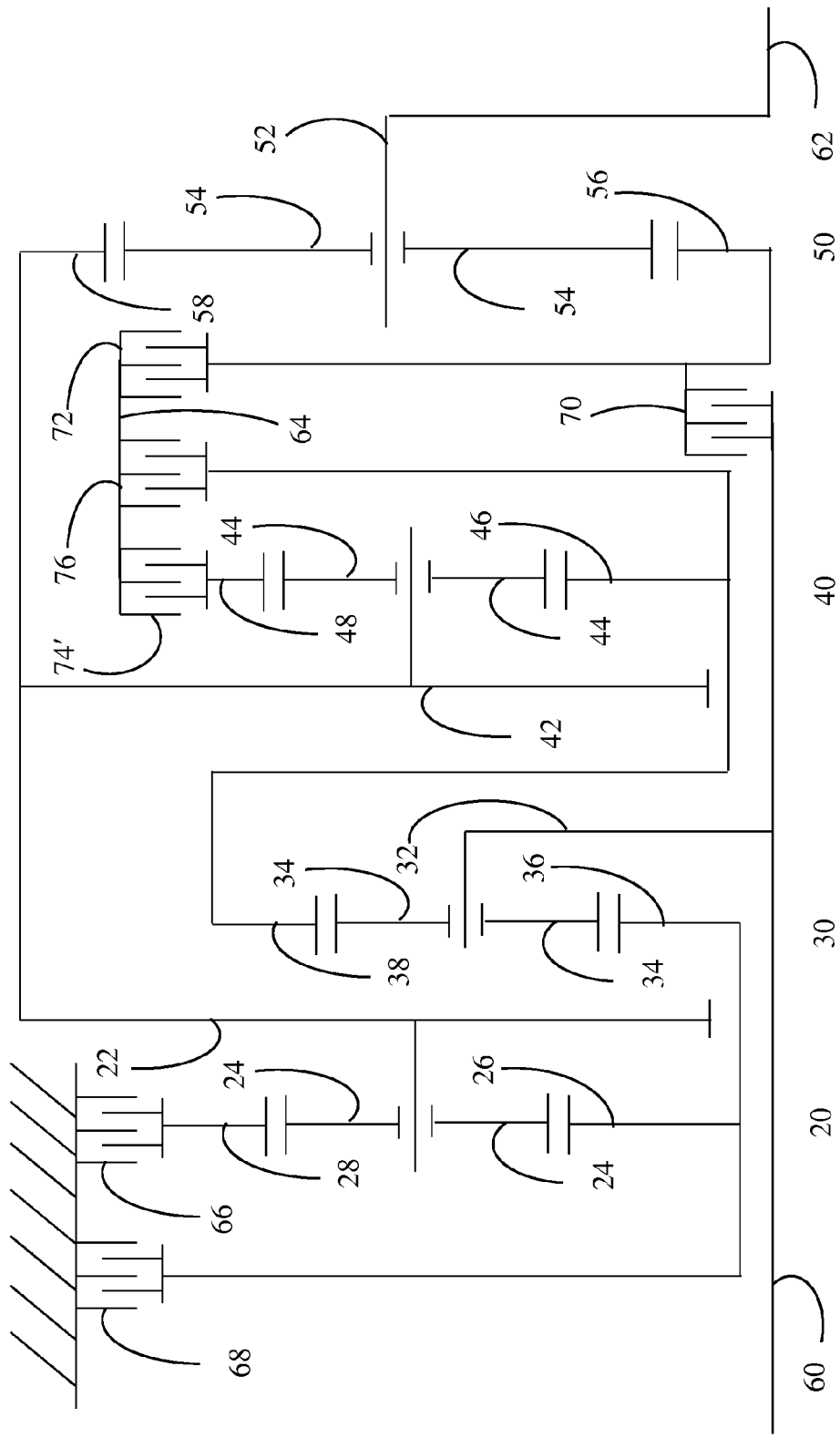
FIG. 2 is a schematic diagram of a second transmission gearing arrangement.

Another example transmission is illustrated in FIG. 2. In this transmission, intermediate shaft 64 is selectively coupled to ring gear 48 by clutch 74' while carrier 42 is fixedly coupled to carrier 22 and ring gear 58. The remaining features are as described with regard to the transmission of FIG. 1. Clutch 74' is applied in the same ratios as clutch 74 of FIG. 1.

Figure 3:
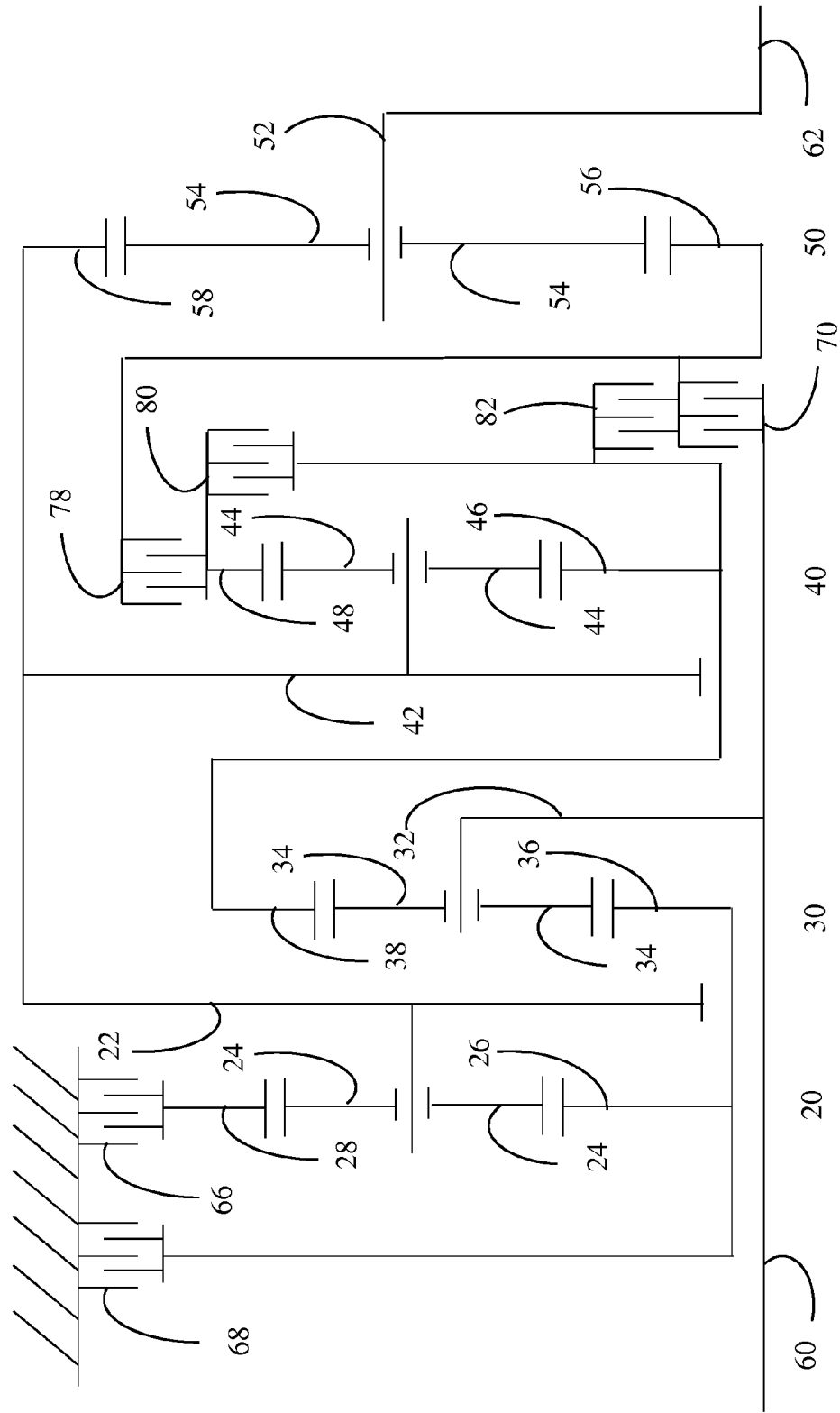
FIG. 3 is a schematic diagram of a third transmission gearing arrangement.

A third example transmission is illustrated in FIG. 3. In this transmission, clutch 78 selectively couples ring gear 48 to sun gear 56, clutch 80 selectively couples ring gear 48 to ring gear 38 and sun gear 46, and clutch 82 selectively couples ring gear 38 and sun gear 46 to sun gear 56. This module of three clutches, like the module of clutches 72, 74, and 76 in FIG. 2, permits the selective coupling of any two of the three rotating elements. In the transmission of FIG. 2, selectively coupling two elements is accomplished by engaging two clutches, thereby coupling each element to intermediate shaft 64. In the transmission of FIG. 3, a single clutch is engaged to selectively couple two elements. As shown in Table 3, engaging the clutches and brakes of FIG. 3 in combinations of three establishes ten forward speed ratios and one reverse speed ratio between input shaft 60 and output shaft 62. When the gears have the same number of teeth as the corresponding gears in FIGS. 1 and 2, the resulting speed ratios are identical.

TABLE 3

|  | 66 | 68 | 70 | 78 | 80 | 82 | Ratio | Step |
|---|---|---|---|---|---|---|---|---|
| Rev | X | X |  | X |  |  | −4.79 | 102% |
| 1st | X | X | X |  |  |  | 4.70 |  |
| 2nd | X | X |  |  |  | X | 2.99 | 1.57 |
| 3rd | X |  | X |  |  | X | 2.18 | 1.37 |
| 4th | X |  |  | (X) | X | X | 1.80 | 1.21 |
| 5th | X |  | X |  | X |  | 1.54 | 1.17 |
| 6th | X |  | X | X |  |  | 1.29 | 1.19 |
| 7th |  |  | X | X | X | (X) | 1.00 | 1.29 |
| 8th |  | X | X | X |  |  | 0.85 | 1.17 |
| 9th |  | X | X |  | X |  | 0.69 | 1.24 |
| 10th |  | X |  | X | X | (X) | 0.64 | 1.08 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   input, output, and intermediate shafts;
   a first planetary gear set having a first sun gear, a first ring gear, a first carrier fixedly coupled to the input shaft, and a set of planet gears in continuous meshing engagement with the first sun gear and the first ring gear;
   a second planetary gear set having a second sun gear, a second ring gear, a second carrier fixedly coupled to the output shaft, and a set of planet gears in continuous meshing engagement with the second sun gear and the second ring gear;
   a third planetary gear set having a third sun gear fixedly coupled to the first ring gear, a third ring gear, a third carrier, and a set of planet gears in continuous meshing engagement with the third sun gear and the third ring gear;
   a fourth planetary gear set having a fourth sun gear, a fourth ring gear, a fourth carrier, and a set of planet gears in continuous meshing engagement with the fourth sun gear and the fourth ring gear;
   a first clutch arranged such that when the first clutch is engaged i) the intermediate shaft and the third ring gear rotate as a unit and ii) the second ring gear and the third carrier rotate as a unit;
   a second clutch configured to selectively operably couple the third sun gear to the intermediate shaft;
   a third clutch configured to selectively couple the input shaft to the second sun gear;
   a fourth clutch configured to selectively couple the second sun gear to the intermediate shaft; and
   a first brake configured to selectively hold the first sun gear against rotation.

2. The transmission of claim 1 further comprising a sixth shift element arranged such that when the sixth shift element is engaged i) the fourth sun gear and the first sun gear rotate as a unit ii) the fourth carrier and the second ring gear rotate as a unit, and iii) the fourth ring gear is held against rotation.

3. The transmission of claim 2 wherein
   the fourth sun gear is fixedly coupled to the first sun gear;
   the fourth carrier is fixedly coupled to the second ring gear; and
   the sixth shift element is configured to selectively hold the fourth ring gear against rotation.

4. The transmission of claim 1 wherein
   the third ring gear is fixedly coupled to the intermediate shaft; and
   the first clutch is configured to selectively couple the third carrier to the second ring gear.

5. The transmission of claim 1 wherein
the third carrier is fixedly coupled to the second ring gear; and
the first clutch is configured to selectively couple the third ring gear to the intermediate shaft.

6. A transmission comprising:
input, output, and intermediate shafts;
a first gearing arrangement configured to fixedly impose a linear speed relationship among a first element, the input shaft, and a second element;
a second gearing arrangement configured to fixedly impose a linear speed relationship among a third element, the output shaft, and a fourth element;
a third gearing arrangement configured to fixedly impose a linear speed relationship among the second element, a fifth element, and a sixth element;
a fourth gearing arrangement configured to selectively constrain the fourth element to rotate at a speed between zero and a speed of the first element;
a first clutch arranged such that when the first clutch is engaged i) the intermediate shaft and the sixth element rotate as a unit and ii) the fourth element and the fifth element rotate as a unit;
a second clutch configured to selectively couple the second element to the intermediate shaft;
a third clutch configured to selectively couple the input shaft to the third element;
a fourth clutch configured to selectively couple the third element to the intermediate shaft; and
a first brake configured to selectively hold the first element against rotation.

7. The transmission of claim 6 wherein the fourth gearing arrangement comprises
a fifth gearing arrangement configured to fixedly impose a linear speed relationship among the first element, the fourth element, and a seventh element; and
a second brake configured to selectively hold the seventh element against rotation.

8. The transmission of claim 6 wherein
the sixth element is fixedly coupled to the intermediate shaft; and
the first clutch is configured to selectively couple the fifth element to the fourth element.

9. The transmission of claim 6 wherein
the fifth element is fixedly coupled to the fourth element; and
the first clutch is configured to selectively couple the sixth element to the intermediate shaft.

10. A transmission comprising:
input and output shafts;
a first gearing arrangement configured to fixedly impose a linear speed relationship among a first element, the input shaft, and a second element;
a second gearing arrangement configured to fixedly impose a linear speed relationship among a third element, the output shaft, and a fourth element;
a third gearing arrangement configured to fixedly impose a linear speed relationship among the second element, the fourth element, and a fifth element;
a fourth gearing arrangement configured to selectively constrain the fourth element to rotate at a speed between zero and a speed of the first element;
a first clutch configured to selectively couple the input shaft to the third element;
a first brake configured to selectively hold the first element against rotation; and
a clutch module configured to selectively couple combinations of two of the second element, the third element, and the fifth element.

11. The transmission of claim 10 wherein the clutch module comprises
an intermediate shaft;
a second clutch configured to selectively couple the intermediate shaft to the second element;
a third clutch configured to selectively couple the intermediate shaft to the fifth element; and
a fourth clutch configured to selectively couple the intermediate shaft to the third element.

12. The transmission of claim 10 wherein the clutch module comprises
a second clutch configured to selectively couple the second element to the third element;
a third clutch configured to selectively couple the second element to the fifth element; and
a fourth clutch configured to selectively couple the third element to the fifth element.

13. The transmission of claim 10 wherein the fourth gearing arrangement comprises
a fifth gearing arrangement configured to fixedly impose a linear speed relationship among the first element, the fourth element, and a seventh element; and
a second brake configured to selectively hold the seventh element against rotation.

14. A transmission comprising:
an input shaft fixedly coupled to a carrier of a first planetary gear set;
an output shaft fixedly coupled to a carrier of a second planetary gear set;
first, second, third, fourth, fifth, sixth, and seventh intermediate shafts;
a first brake configured to selectively hold the first intermediate shaft against rotation;
a second brake configured to selectively hold the third intermediate shaft against rotation;
a first clutch configured to selectively couple the fourth intermediate shaft to the seventh intermediate shaft;
a second clutch configured to selectively couple the sixth intermediate shaft to the seventh intermediate shaft;
a third clutch configured to selectively couple the input shaft to the sixth intermediate shaft; and
a fourth clutch configured to selectively couple the fifth intermediate shaft to the seventh intermediate shaft.

15. The transmission of claim 14 wherein the first intermediate shaft is fixedly coupled to the sun of the first planetary gear set and to a sun of a third planetary gear set.

16. The transmission of claim 14 wherein the second intermediate shaft is fixedly coupled to a ring of the second planetary gear set, a carrier of a third planetary gear set, and a carrier of a fourth planetary gear set.

17. The transmission of claim 14 wherein the fourth intermediate shaft is fixedly coupled to a ring of the first planetary gear set and to a sun of a fourth planetary gear set.

18. The transmission of claim 14 wherein the sixth intermediate shaft is fixedly coupled to a sun of the second planetary gear set.

19. The transmission of claim 14 wherein the seventh intermediate shaft is not fixedly coupled to any planetary gear.

20. A transmission comprising
input and output shafts;
first, second, third, fourth, fifth, sixth, and seventh intermediate shafts;
a first brake configured to selectively hold the first intermediate shaft against rotation;

a second brake configured to selectively hold the third intermediate shaft against rotation;

a first clutch configured to selectively operably couple the fourth intermediate shaft to the sixth intermediate shaft;

a second clutch configured to selectively couple the sixth intermediate shaft to the seventh intermediate shaft;

a third clutch configured to selectively couple the input shaft to the seventh intermediate shaft;

a fourth clutch configured to selectively couple the second intermediate shaft to the fifth intermediate shaft;

a first gearing arrangement configured to fixedly impose a linear speed relationship among the first intermediate shaft, the second intermediate shaft, and the third intermediate shaft;

a second gearing arrangement configured to fixedly impose a linear speed relationship among the first intermediate shaft, the input shaft, and the fourth intermediate shaft;

a third gearing arrangement configured to fixedly impose a linear speed relationship among the fourth intermediate shaft, the fifth intermediate shaft, and the sixth intermediate shaft; and a fourth gearing arrangement configured to fixedly impose a linear speed relationship among the seventh intermediate shaft, the output shaft, and the second intermediate shaft.

21. The transmission of claim 20 wherein the first gearing arrangement comprises a first sun gear fixedly coupled to the first intermediate shaft;

a first ring gear fixedly coupled to the third intermediate shaft;

a first carrier fixedly coupled to the second intermediate shaft; and a set of planet gears in continuous meshing engagement with the first sun gear and the first ring gear.

22. The transmission of claim 20 wherein the second gearing arrangement comprises a second sun gear fixedly coupled to the first intermediate shaft;

a second ring gear fixedly coupled to the fourth intermediate shaft;

a second carrier fixedly coupled to the input shaft; and a set of planet gears in continuous meshing engagement with the second sun gear and the second ring gear.

23. The transmission of claim 20 wherein the third gearing arrangement comprises a third sun gear fixedly coupled to the fourth intermediate shaft;

a third ring gear fixedly coupled to the sixth intermediate shaft;

a third carrier fixedly coupled to the fifth intermediate shaft; and a set of planet gears in continuous meshing engagement with the third sun gear and the third ring gear.

24. The transmission of claim 20 wherein the fourth gearing arrangement comprises a fourth sun gear fixedly coupled to the seventh intermediate shaft;

a fourth ring gear fixedly coupled to the second intermediate shaft;

a fourth carrier fixedly coupled to the output shaft; and a set of planet gears in continuous meshing engagement with the fourth sun gear and the fourth ring gear.

* * * * *